United States Patent Office 2,765,287
Patented Oct. 2, 1956

2,765,287

CONDENSATION PRODUCTS OF UREA-FORM-ALDEHYDE RESIN AND AN AMIDE AND METHODS FOR PRODUCING THEM

Benjamin F. Aycock, Elkins Park, Pa., assignor to Rohm & Haas Company, Philadelphia, Pa., a corporation of Delaware No Drawing. Application April 30, 1954,
Serial No. 426,903

19 Claims. (Cl. 260—28)

This invention relates to condensation products of formaldehyde with urea and a high molecular weight hydrophobic amide and to methods of producing them, and it is particularly concerned with the production of such condensation products capable of application to textiles and other materials for the purpose of rendering them water-repellent, or sizing, lubricating, softening, or conditioning them.

It is a primary object of the invention to produce condensation products of the above type which are water-insoluble, solid or pasty masses at room temperature and well above it, and are easily emulsifiable or dispersible in water with a wide range of dispersing agents at elevated temperatures. A further object is to provide methods of producing the novel condensation products. Other objects and advantages will be apparent from the description hereinafter.

According to the present invention, a high molecular weight carboxylic acid amide having from 12 to 30 carbon atoms and being of hydrophobic character is reacted with a methylated or ethylated polymethylol urea.

The high molecular amide contemplated is a hydrophobic amide such as fatty acid amides and N-substituted fatty acid amides as well as the hydrophobic alicyclic types of amides having 12 to 30 carbon atoms. Specific examples include lauramide, palmitamide, stearamide, N-methylstearamide, abietic acid amide, montanic acid amide, and naphthenic acid amide.

The alkylated methylol urea may be obtained by reacting a mixture of urea with formaldehyde and the particular alcohol in aqueous medium, or it may be produced by first reacting urea with formaldehyde in aqueous medium and then reacting the resulting hydrophilic condensate with a particular alcohol. In either case, the proportions between the various reactants must fall in definite limits. The molar ratio between the formaldehyde and urea should be at least 2:1 in moles and is preferably between 2:1 and 3:1. Higher proportions of formaldehyde may be present but are unnecessary and generally undesirable. The molar ratio of the alcohol to the urea should be between 2.5:1 and 4:1. A greater amount of alcohol may be present but is unnecessary. Conventional conditions of reaction for producing these methylated or ethylated methylol ureas may be employed. For example, the reaction between urea and formaldehyde may be effected at temperatures of 30°–80° C. for periods of time from fifteen minutes to three quarters of an hour at a pH of 8 to 10. The reaction with the alcohol may then follow after adjusting the pH to within the range of 3 to 4.5 at temperatures of 60°–90° C. for a time of fifteen minutes to one hour. The resulting condensate is a low molecular weight water-soluble methylated or ethylated polymethylol urea of about 75%–90% concentration in an aqueous alcohol solution.

This urea condensate is then mixed with the amide to be condensed with it in a proportion of 35 to 70 parts by weight of the urea condensate to 65 to 30 parts by weight respectively of the amide. Preferred proportions are from 55 to 65 parts by weight of the urea condensate with 45 to 35 respectively of the amide. The amide is preferably heated until it is molten before it is added to the urea condensate, but it may be introduced in solid form and then melted by heating the mixture. The molten mixture is agitated and a catalyst of acid character, such as phosphoric acid, formic acid or the like, is added to adjust the pH to 3.5 to 4. It is heated at 85°–90° C. for a period of 20 to 35 minutes, during which time methanol is liberated and may be removed or refluxed. At the end of the reaction, the pH is adjusted to between 7 and 8, preferably about 7.3 to 7.5 to terminate it.

It has been found that the molar proportions of the urea, formaldehyde, and alcohol stated hereinbefore are quite important in order to minimize side reactions and the production of by-products. By maintaining the ratio of formaldehyde to urea at least at two moles to one mole and the ratio of the alcohol to the urea at least at 2.5 moles to 1 mole, the production of such by-products as methylene - bis - stearamide and the condensation of the urea-formaldehyde condensate with itself is hindered. At the same time, the condensation product has and retains good miscibility with the amide so that little difficulty is encountered in maintaining good contact during the reaction between the amide and the urea-formaldehyde condensate.

It is believed that the reaction may involve (1) the elimination of molecules of the alcohol by the removal of an alkoxy group (from the alkylated methylol urea) in conjunction with the removal of a hydrogen atom from the amide groups or (2) the elimination of an hydroxy group from a methylol group in conjunction with the removal of a hydrogen atom from the amide group or (3) both reactions 1 and 2. The proportion of amide groups introduced into the urea-formaldehyde condensate may vary with the time of reaction and the relative proportions of the two reactants present. There may be a complete or only a partial replacement of the various alkoxy or hydroxy groups in the urea condensate.

Whatever the particular reaction involved may entail, the condensation product obtained may be directly emulsified in water with the aid of a dispersing or emulsifying agent. This emulsification should be effected, if done immediately, while the condensate is in a liquid condition, generally at a temperature of somewhat above 85° C. Alternatively, the neutralized condensation product of the amide with the urea condensate may be cooled to produce a waxy or pasty solid mass at room temperature. This mass may be stored or shipped as such, and can subsequently be readily emulsified in water by heating to above its melting point, either in the presence of the water or before adding to the amount of water in which it is to be emulsified, and subsequently agitating the molten mass in the water in the presence of an emulsifier or dispersing agent.

Various dispersing agents may be used. Examples are: the alkali metal salts of sulfonated alkylaryl compounds such as sodium isopropylnaphthalene sulfonate; the alkali metal salts of sulfated higher fatty alcohols, such as sodium lauryl sulfate; the alkali metal salts of higher fatty acids, such as sodium or potassium stearate; the alkali metal salts of the esters of sulfosuccinic acid with higher fatty alcohols, such as sodium dioctyl sulfosuccinate; the sodium salt of methylaminoethane sulfonic acid, the sodium salt of oleylmethyltauric acid, the triethanolamine salt of oleic acid, the triethanolamine salt of stearic acid, the morpholine salt of oleic acid. Besides the anionic types of dispersing agents just mentioned, the cationic types, such as lauryl pyridinium chloride, and non-ionic types may be used. These latter include octyl-, nonyl-, dodecylphenoxypolyethoxyethanols, and the like; polyethoxyethanol derivatives of methylene linked alkylphenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophilic ethylene oxide sections.

Preferred non-ionic emulsifiers are those obtained by the condensation of ethylene oxide with higher fatty alcohols, such as lauryl, palmityl or stearyl alcohol or mixtures thereof with 20 to 40 moles of ethylene oxide per mole of the alcohol.

From 2.5 to 10% of the dispersing agent or emulsifier is used based on the weight of the amide condensate.

The resulting condensate may be applied to textiles, such as yarns, fibers, or filaments, threads or cords, felts or fabrics, paper, leather, or the like, to modify their properties and especially to render them water-repellent. The amide condensate may have a concentration of 3 to 50% by weight in its aqueous emulsion but preferably is about 5 to 15% concentration when applied to these materials. Instead of applying the amide condensate as an emulsion, it may be applied as a solution in an organic solvent, such as in alcohols, including ethanol, isopropanol, n-butanol, or isobutanol as well as in aromatic hydrocarbons, such as benzene, toluene, and xylenes, at room temperatures or higher, preferably at temperatures somewhat above room temperature, such as 45° to 70° C.

Other ingredients may be incorporated into the solutions or emulsions to vary their character and to vary the properties of the condensate when on textile fabrics or the like. Generally a catalyst should be added to the emulsion or solution to favor condensation and possibly reaction with fabrics, if of cellulosic type, or with other substrates which may contain reactive groups with which the condensate may combine. An acidic catalyst, such as an acid or a salt of a strong acid with a weak base, may be employed. The catalyst may be of latent type so that no condensation will be effected until the temperature is raised into the baking or curing range, such as 220–300° F. Examples of catalysts include ammonium chloride, ammonium thiocyanate, ammonium sulfate, ammonium phosphate, ammonium nitrate, organic amine salts, such as hydrochloric, or other acid salts of a hydroxy aliphatic amine including 2-methyl-2-amino-1-propanol, 2-methyl-2-amino-1,3-propandiol, tris(hydroxymethyl)aminomethane, 2-phenyl-2-amino-1-propanol; 2-methyl-2-amino-1-pentanol, 2-aminobutanol, triethanolamine, 2-amino-2-ethyl-1-butanol, also ammonium chloride, pyridine hydrochloride, benzyldimethylamine oxalate. The amine salts are water-soluble latent catalysts substantially neutral at ordinary temperature but dissociate into volatile components one of which is acidic at the elevated temperatures used for baking and curing, so that the catalyst after exerting its accelerating effect is automatically discharged from the fabric during the heating stage.

Sometimes when ammonium salts are employed as catalysts, a small amount of ammonium hydroxide may also be included with beneficial results. The proportion of catalyst may be from 0.1 to 1% of the weight of the emulsion or solution and is preferably 0.4 to 0.5%. As much as 1% of ammonium hydroxide may also be added when ammonium salts are used as catalysts.

Coloring agents, such as dyes, anti-static agents, and auxiliary lubricating, softening, or conditioning agents may be incorporated. Higher hydrocarbons, such as mineral oil and paraffin wax have been found particularly advantageous when incorporated in an amount of 1 to 5% on the weight of the emulsions for rendering them smoother flowing and somewhat more stable. For certain purposes, other lubricants, such as vegetable or animal oils may be incorporated.

The dispersions (including the emulsions and solutions) find a wide variety of uses. An important one is the application to leather, paper, paperboard, textile materials and particularly fabrics and felts, for rendering them water-repellent. For this purpose, from 2 to 10% by weight of the amide condensate may be applied to the fabric or the like based on the weight of the latter. The application of 5% on the weight of the fabric or the like is highly effective in rendering the fabric water-repellent in character. The fabric that may thus be treated may comprise fibers or filaments of any material whatsoever, such as rayon, cotton, cellulose acetate, nylon, as well as other types of natural and artificial fibers. The fabrics may comprise yarns of different materials or yarns of blends of different materials. The amide condensate may also be applied to textile materials and particularly woven fabrics, including pile or plush types of fabrics of the various fibrous materials mentioned hereinabove and particularly viscose rayon and cotton in conjunction with a crease-proofing or crush-proofing treatment. For example, from 1 to 5% of the amide condensate may be introduced into an aqueous medium containing from 5 to 15% by weight of a crease-proofing or crush-proofing agent. In such application, the amide condensate serves to increase tear strength, to soften and lubricate the fibers of the fabric and improve the hand or feel thereof. The crease-proofing or crush-proofing agent with which the condensate of the present invention may be used may be formaldehyde, dialdehydes, such as glyoxal, water-soluble amino-plast thermosetting resin condensates, such as methylol ureas, including dimethylol urea or an alkylated methylol urea, similar water-soluble condensates of formaldehyde with substituted ureas as well as urea derivatives, 1,3-dimethylol-2-imidazolidone, and also formaldehyde condensates of triazines, such as polymethylolmelamine, and corresponding water-soluble condensates of melem, melam, and the like. The amide condensate may be applied to dyed fabrics and particularly those of cellulose acetate for the purpose of fixing the dye more permanently on the fibers. The amide condensate may be used in its solid waxy form as a lubricant for yarns, threads or cords. Thus a sewing thread may be lubricated merely by drawing the thread over a cake of the waxy amide condensate. The amide condensates may be applied from an emulsion or solution to highly twisted yarns, such as crepe yarns, for the setting of twist therein. Similarly they may be applied to loose fibers or filaments for the purpose of rendering them more amenable to textile operations, such as carding, drafting, combing, or the like. They may be applied to yarns to adapt them for weaving, knitting, or other textile fabricating operations. In general, the amide condensates are characterized by an extremely low chlorine retention and they impart a soft, full hand to yarns, fabrics or the like.

The following examples designated A to E inclusive illustrate the preparation of the alkylated methylol urea which is the starting material for the amide condensates which are used in the subsequent numerical examples which illustrate the preparation of the amide condensates of the invention.

*Example A*

There are charged to a reaction vessel 60 parts by weight of urea and 211 parts of aqueous 50% formaldehyde. A small amount of aqueous 10% sodium hydroxide solution is added to bring the pH of the mixture above pH 8. The mixture is heated at about 75° C. for 20 minutes, at which time a determination of formaldehyde with cold sodium sulfite solution followed by titration of alkalinity shows that about 90% of the formaldehyde was reacted. The reaction is placed under reduced pressure and volatile material taken off to leave a solution of 85% nonvolatile material in the reaction vessel. Thereto is added 96 parts of methanol. The mixture is adjusted with a solution of equal parts of phosphoric acid and methanol to a pH of 3.3. The mixture was then heated to refluxing temperature and held there for 20 minutes. The reaction mixture is cooled to 55° C. and treated with three parts of aqueous 10% sodium hydroxide solution to bring the pH thereof to a value of 7. The neutral mixture is heated under reduced pressure, methanol and water being taken off. A yield of 174.4 parts of product is obtained.

The product is a clear, almost colorless liquid with a viscosity of D on the Gardner-Holdt scale. It has a specific gravity of 1.2.

*Example B*

A reaction vessel is charged with 96 parts of methanol, 18 parts of an aqueous 36.3% formaldehyde solution, and 78.5 parts of 91% paraformaldehyde flake. The mixture is adjusted to a pH of 8.5 with 10% sodium hydroxide solution and gently heated at reflux until it becomes clear. Urea is added in an amount of 60 parts, the pH of the mixture is readjusted, and the mixture is then heated at 70°–75° C. for 20 minutes. The mixture is treated with a solution of phosphoric acid in methanol to a pH of about 3.5 and heated under reflux for 15 minutes. The mixture is cooled to 55° C. Alkali solution is added to bring the pH to 7.2 and the mixture heated under reduced pressure to remove the bulk of volatile materials. The product is a clear, practically colorless syrup having a viscosity of G on the Gardner-Holdt scale. It has a specific gravity of 1.22 and is miscible with water in all proportions.

*Example C*

The procedure of Example A was followed except that 120 parts of ethanol were substituted for the 96 parts of ethanol.

*Example 1*

There were introduced into a reaction vessel 62 parts by weight of the product obtained in Example A above which contained 82% of the urea condensate. In addition, there were added 40 parts by weight of a mixture of amides of 16 to 18 carbon atom fatty acids containing 70% of stearamide which is now commercially available under the trade name Armid HT. The mixture was then heated to 90° C. to melt the amide. The mixture was stirred continuously and refluxed during the reaction which was started by adding phosphoric acid immediately after melting of the amide to lower the pH to 3.9. After lowering the pH, heat was applied to maintain the reaction between 86° and 90° C. for 25 minutes. Then 58% sodium hydroxide was added to adjust the pH to 7.4. The product was mixed with 2% paraffin and 10% of a dispersing agent consisting of an ethylene oxide condensate of palmityl alcohol containing an average of about 30 ethylene oxide units. Water was added to produce a 25% concentration of the amide condensate over a period of 30 minutes, the temperature being maintained at 95°–98° C. during the addition of the water. Then the mixture was cooled to 80° C. while stirring and then immediately poured into suitable storage vessels in which it was allowed to cool.

Portions of the dispersion thus obtained were diluted to 5% concentration, 0.5% of ammonium chloride and about 1% of ammonium hydroxide (percentages on the weight of the dispersion) were added and rayon and cotton fabric were padded through the dispersion. After squeezing excess from the fabric, it was dried on a tenter frame over a period of 3 to 5 minutes at 250° F. and cured 10 minutes at 300° F. The resulting fabrics were highly water-repellent and retained their repellency even after several washes and dry-cleaning.

Corresponding amounts of the alkylated methylol urea condensates of Examples B and C were substituted for the amount of the condensate of Example A herein and similarly applied to cotton and rayon fabrics with similar results.

*Example 2*

The procedure of Example 1 was followed except that the methylated methylol urea condensate of Example A was replaced entirely with 45 parts of the condensate of Example B (85% solids), 60 parts of stearamide were substituted for the Armid HT, and the 2% paraffin was replaced with 3% mineral oil.

The resulting dispersion was applied to cotton and rayon fabrics with similar results in producing water-repellent fabrics which were resistant to washing and dry-cleaning.

*Example 3*

The procedure of Example 1 was followed except that 75 parts by weight of the condensate of Example B (95% solids) was substituted for the condensate of Example A and 30 parts by weight of palmitamide was substituted for the Armid HT.

The resulting condenate was applied from an aqueous dispersion of 10% concentration to rayon and cotton fabrics with results which were similar to those of Example 1.

*Example 4*

The procedure of Example 1 was followed except that 40 parts by weight of the condensate of Example B (87% solids) was substituted for the condensate of Example A and 60 parts by weight of lauramide was substituted for the Armid HT.

The paraffin and ethylene oxide modified palmityl alcohol were omitted and instead of producing an aqueous emulsion or dispersion the amide condensate was cooled to a solid mass which was then formed into a cake. Sewing thread was drawn over the solid mass to produce a lubricated thread adapted to be used in shoe machinery and for sewing canvas tents and the like.

*Example 5*

The dispersion prepared in Example 1 was diluted to 3.75% concentration. Eighty parts by weight of the dispersion was mixed with 20 parts by weight of a 75% aqueous solution of a water-soluble condensation product of a mixture of 1 mole of melamine and 3 moles of formaldehyde and 0.5 part by weight of the hydrochloride of 2-methyl-2-amino-1-propanol. A woven cotton fabric was padded through the resulting dispersion, excess was squeezed off, and after being dried three minutes at 250° F., the fabric was cured 10 minutes at 300° F. The resulting fabric was crease-proofed without appreciable reduction in tear strength and exhibited a soft, full hand.

*Example 6*

The procedure of Example 5 was followed except that a corresponding amount of dimethylol urea was substituted for the melamine formaldehyde condensate. The results were similar to those obtained in Example 5.

*Example 7*

The procedure of Example 5 was followed except that a corresponding amount of 1,3-bis(hydroxymethyl)2-imidazolidone of the formula

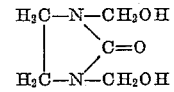

was substituted for the melamine-formaldehyde condensate with similar results in the treated fabric.

It is to be understood that changes and variations may be made without departing from the spirit and scope of the invention as defined by the appended claims.

I claim:

1. A composition comprising a reaction product of a mixture comprising (1) a high molecular weight hydrophobic amide having 12 to 30 carbon atoms and (2) a condensation product of urea, at least 2 moles of formaldehyde for each mole of urea and at least 2.5 moles of alcohol selected from methanol and ethanol for each mole of the urea.

2. A composition comprising a reaction product of a mixture comprising (1) 30 to 65 parts by weight of a high molecular weight hydrophobic amide having 12 to 30 carbon atoms and (2) 70 to 35 parts by weight respectively of a condensation product of urea, at least 2 moles of formaldehyde for each mole of the urea and at least 2.5 moles of an alcohol selected from methanol and ethanol for each mole of urea.

3. A composition comprising a reaction product of a mixture comprising (1) 35 to 45 parts by weight of a high molecular weight hydrophobic amide having 12 to 30 carbon atoms and (2) 65 to 55 parts by weight respectively of a condensation product of urea, at least 2 moles of formaldehyde for each mole of the urea and at least 2.5 moles of an alcohol selected from methanol and ethanol for each mole of the urea.

4. A composition comprising a reaction product of a mixture comprising (1) a high molecular weight hydrophobic amide having 12 to 30 carbon atoms and (2) a condensation product of urea, at least 2 moles of formaldehyde per mole of urea, and at least 2.5 moles of methanol per mole of urea.

5. A composition comprising a reaction product of a mixture comprising (1) 30 to 65 parts by weight of a high molecular weight hydrophobic amide having 12 to 30 carbon atoms and (2) 70 to 35 parts by weight respectively of a condensation product of urea, at least 2 moles of formaldehyde per mole of urea, and at least 2.5 moles of methanol per mole of urea.

6. A composition comprising a reaction product of a mixture comprising (1) 35 to 45 parts by weight of a high molecular weight hydrophobic amide having 12 to 30 carbon atoms and (2) 65 to 55 parts by weight respectively of a condensation product of urea, at least 2 moles of formaldehyde per mole of urea, and at least 2.5 moles of ethanol per mole of urea.

7. A composition comprising a reaction product of stearamide with a condensation product of urea, at least 2 moles of formaldehyde for each mole of the urea and at least 2.5 moles of an alcohol selected from methanol and ethanol for each mole of the urea.

8. A composition comprising a reaction product of stearamide with a condensation product of urea, at least 2 moles of formaldehyde per mole of urea, and at least 2.5 moles of methanol per mole of urea.

9. A composition comprising a reaction product of 30 to 65 parts by weight of stearamide with 70 to 35 parts by weight respectively of a condensation product of urea, at least 2 moles of formaldehyde per mole of urea, and at least 2.5 moles of methanol per mole of urea.

10. A composition comprising a reaction product of 35 to 45 parts by weight of stearamide with 65 to 55 parts by weight respectively of a condensation product of urea, at least 2 moles of formaldehyde per mole of urea, and at least 2.5 moles of methanol per mole of urea.

11. A composition comprising a higher hydrocarbon selected from the group consisting of mineral oils and paraffin waxes, and a reaction product of a mixture comprising (1) a high molecular weight hydrophobic amide having 12 to 30 carbon atoms, (2) a condensation product of urea, at least 2 moles of formaldehyde for each mole of the urea and at least 2.5 moles of an alcohol selected from methanol and ethanol for each mole of the urea, and (3) an acidic catalyst.

12. A composition as defined in claim 11 in which the hydrocarbon is mineral oil and it is present in a proportion of 1 to 5% by weight of the reaction product.

13. A composition as defined in claim 11 in which the hydrocarbon is paraffin wax and it is present in a proportion of 1 to 5% by weight of the reaction product.

14. An aqueous composition comprising 5 to 15% by weight of 1,3-bis-(hydroxymethyl)-2-imidazolidone and 1 to 5% by weight of the reaction product of a mixture comprising (1) a high molecular weight hydrophobic amide having 12 to 30 carbon atoms, (2) a condensation product of urea, at least 2 moles of formaldehyde for each mole of the urea and at least 2.5 moles of the alcohol selected from methanol and ethanol for each mole of the urea, and (3) an acidic catalyst.

15. A composition comprising a higher hydrocarbon selected from the group consisting of mineral oils and paraffin waxes, and a reaction product of a mixture comprising (1) 30 to 65 parts by weight of a high molecular weight hydrophobic amide having 12 to 30 carbon atoms, (2) 70 to 35 parts by weight respectively of a condensation product of urea, at least 2 moles of formaldehyde for each mole of the urea, and at least 2.5 moles of an alcohol selected from methanol and ethanol for each mole of the urea, and (3) an acidic catalyst.

16. A composition as defined in claim 15 in which the hydrocarbon is paraffin wax and it is present in a proportion of 1 to 5% by weight of the reaction product.

17. A heat-convertible resinous condensation product suitable for finishing textile materials consisting of the product secured by reacting one mole of urea with 2.5 to 3.5 moles of a substantially anhydrous material which furnishes formaldehyde under the reaction conditions and with 3 to 4 moles of an unsubstituted aliphatic alcohol containing up to 2 carbon atoms preliminarily under alkaline conditions and subsequently under acid conditions to secure a resinous partial condensation product thereof, and thereafter reacting said resinous partial condensation product under acid conditions with approximately 0.1 to 1.7 moles of stearamide.

18. A process for preparing a heat-convertible resinous condensation product suitable for finishing textile materials which consists in reacting one mole of urea with 2.5 to 3.5 moles of a substantially anhydrous material which furnishes formaldehyde under the reaction conditions and with 3 to 4 moles of an unsubstituted aliphatic alcohol containing up to 2 carbon atoms preliminarily under alkaline conditions and subsequently under acid conditions to secure a resinous partial condensation product thereof, and thereafter reacting said resinous partial condensation product under acid conditions with approximately 0.1 to 1.7 moles of stearamide.

19. The method which comprises heating a mixture of (1) a higher molecular weight hydrophobic amide having 12 to 30 carbon atoms with (2) a condensation product of urea, at least 2 moles of formaldehyde for each mole of the urea and at least 2.5 moles of an alcohol selected from methanol and ethanol for each mole of the urea in an aqueous alcoholic solution at a temperature above the melting point of the amide at a pH of 3.5 to 4, and thereafter adjusting the pH to a value between 7 and 8.

References Cited in the file of this patent

UNITED STATES PATENTS

| | | |
|---|---|---|
| 2,328,425 | D'Alelio | Aug. 31, 1943 |
| 2,344,926 | Thackston et al. | Mar. 21, 1944 |
| 2,680,101 | Schibler et al. | June 1, 1954 |
| 2,690,404 | Spangler et al. | Sept. 28, 1954 |
| 2,693,460 | Gagliardi | Nov. 2, 1954 |